United States Patent Office.

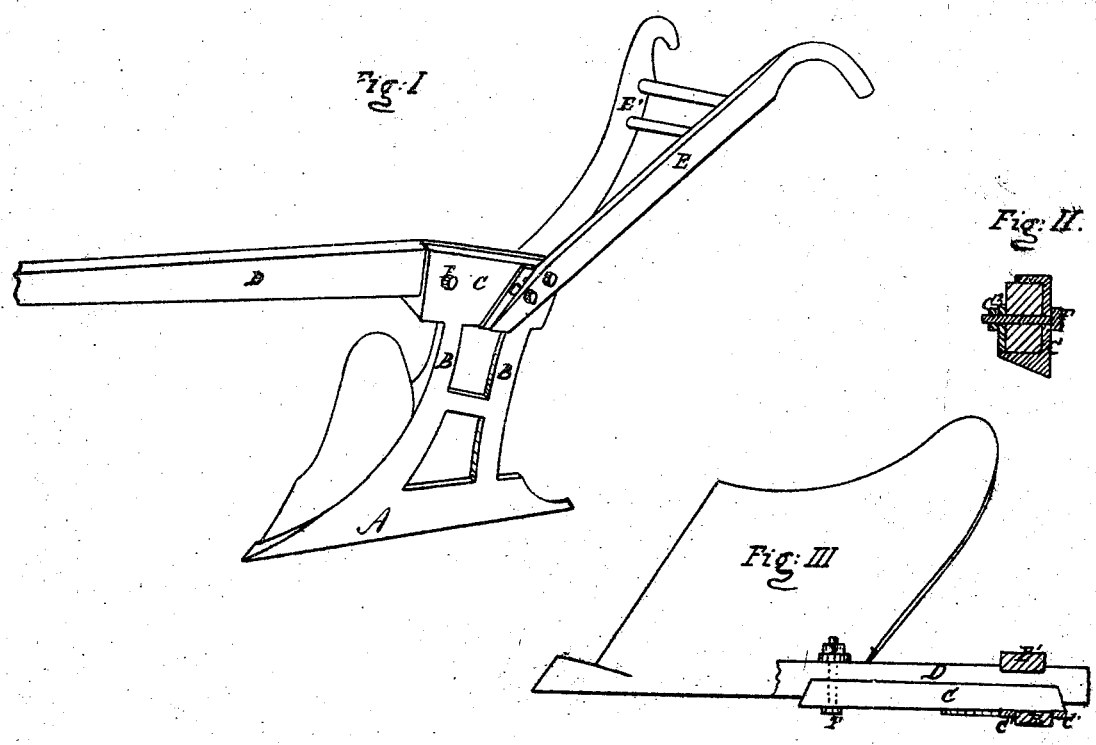

T. E. C. BRINLY, OF LOUISVILLE, KENTUCKY.

Letters Patent No. 71,968, dated December 10, 1867.

IMPROVEMENT IN PLOUGHS.

The Schedule referred to in these Letters Patent and making part of the same.

TO ALL WHOM IT MAY CONCERN:

Be it known that I, T. E. C. BRINLY, of Louisville, in the county of Jefferson, and State of Kentucky, have invented a new and useful Improvement in Ploughs; and I do hereby declare that the following is a full, clear, and exact description of the same, reference being had to the annexed drawings, making part of this specification, in which—

Figure 1 is a perspective view.

Figure 2 is a transverse section of the beam and attachment.

Figure 3 is a plan, the plough being represented as lying upon its side.

The same letters are employed in all the figures when designating identical parts.

This improvement consists in the mode of attaching the beam to the plough.

A is the land-side, to which the mould-board is attached in the manner set forth in a former patent granted to me. The braces B B extending upward from the land-side are attached to a socket-plate, C, which encloses the beam D on three sides, the land-side, braces, and socket being cast in one piece. The beam is secured in the socket by bolts passing through them. The forward bolt F passes through a lug, C'', extending upward from the lower plate of the socket against the fourth side of the beam. Flanges C' extend diagonally across the socket to receive the handle E. The handles are attached by means of bolts passing from side to side. The handle E is curved slightly outward. The handle E' is longer than the handle E, and bent at a greater angle outwardly so that the ploughman may walk directly behind the plough.

What I claim as my invention, and desire to secure by Letters Patent, is—

1. The mode of attaching the beam D to the ploughs, by a socket, C, connected with the land-side by braces B B, substantially as set forth.

2. The combination of the socket C, constructed with diagonal flanges C', the handles, and the beam, substantially as set forth.

In testimony whereof, I have signed my name to this specification in the presence of two subscribing witnesses.

T. E. C. BRINLY.

Witnesses:
  JOHN H. BATES,
  T. W. CONNELLY.